United States Patent
Devaux

(10) Patent No.: US 6,330,021 B1
(45) Date of Patent: Dec. 11, 2001

(54) INTERACTIVE TELEVISION RECEPTION CONSOLE

(75) Inventor: François Devaux, Paris (FR)

(73) Assignee: Syseca S.A., Malakoff (FR)

( * ) Notice: Subject to any disclaimer, the term of this patent is extended or adjusted under 35 U.S.C. 154(b) by 794 days.

(21) Appl. No.: 08/571,236

(22) Filed: Dec. 12, 1995

(30) Foreign Application Priority Data

Dec. 13, 1994 (FR) .................................................. 94 14997

(51) Int. Cl.$^7$ ...................................................... H04N 7/14
(52) U.S. Cl. .................................. 348/14.04; 348/14.03; 725/6; 379/91.01
(58) Field of Search .............................. 379/91.01–91.02, 379/107, 144, 90.01; 348/13, 14, 15, 16, 17, 18, 19, 20

(56) References Cited

U.S. PATENT DOCUMENTS

| | | | |
|---|---|---|---|
| 4,102,493 | * | 7/1978 | Morero ................................. 235/419 |
| 4,707,592 | * | 11/1987 | Ware ...................................... 379/91 |
| 4,868,846 | * | 9/1989 | Kemppi ................................ 379/144 |
| 5,086,457 | * | 2/1992 | Barraud et al. ..................... 379/144 |
| 5,333,181 | * | 7/1994 | Biggs ..................................... 379/91 |
| 5,408,513 | * | 4/1995 | Busch, Jr. et al. .................. 379/144 |
| 5,461,667 | * | 10/1995 | Remillard ............................. 348/13 |
| 5,504,808 | * | 4/1996 | Hamrick, Jr. ....................... 379/144 |
| 5,515,424 | * | 5/1996 | Kenney ................................. 348/14 |
| 5,550,897 | * | 8/1996 | Seiderman .......................... 379/144 |
| 5,594,493 | * | 1/1997 | Nemirofsky ........................... 348/13 |
| 5,604,341 | * | 2/1997 | Grossi et al. ......................... 348/15 |

FOREIGN PATENT DOCUMENTS

| | | |
|---|---|---|
| 0 595 354 A1 | 5/1994 | (EP) . |
| 0 624 040 A2 | 11/1994 | (EP) . |
| WO 91/06160 | 5/1991 | (WO) . |

* cited by examiner

*Primary Examiner*—Xu Mei
(74) *Attorney, Agent, or Firm*—Oblon, Spivak, McClelland, Maier & Neustadt, P.C.

(57) ABSTRACT

This interactive television receiver console comprises a television receiver connected by a televised program reception channel to a televised program distributor implementing transactional applications. It further comprises an all-purpose interface pack with data transmission means connected to the televised program distributor by a data transmission channel, with data reception means connected to the televised program distributor by a data reception channel and with image overlay means connected to the television receiver and working on the image presented to the screen of this receiver, a chip card reader, a keyboard enabling action by an operator, and a chip card that gets plugged into the chip card reader and is customized for at least one transaction, the running of which it manages. Through its all-purpose character which is customized by means of the chip card, this card has a wide range of uses and is, at the same time, highly selective. This enables large-scale distribution for a very great variety of transactional television applications.

12 Claims, 2 Drawing Sheets

INTERACTIVE TELEVISION RECEPTION CONSOLE

BACKGROUND OF THE INVENTION

1. Field of the Invention

The present invention relates to an interactive system enabling participation at home, in front of a television receiver, in a television program such as game or a remote purchase or any other application of a transactional nature such as a page of advertising, etc.

2. Description of the Prior Art

Among existing systems available to television viewers, there is the known multipoint system. This system is limited to a pocket calculator type of pack that is specialized in a specified type of transaction which is a game of lots. This pack comprises a keyboard, photoelectric sensors enabling the acquisition of information elements transmitted in binary form by two flashing luminous rectangles that appear on the screen of the television set at certain times and a microcontroller with a memory enabling the recording of the activity of the keyboard and of the luminous information elements acquired by means of the photoelectric sensors. To take part in a multipoint game proposed during a television program, the viewer, using the photoelectric sensors of his pack, must acquire information elements transmitted to the screen by two flashing luminous rectangles to identify the game. Then, as the case may be, he types in a code on the keyboard of his pack, authorizing participation in the game, and then an acquisition code to answer questions asked during the televised game. To find out his winnings in the game, the viewer must return his pack to a distributor or retailer equipped with a specialized processing terminal.

These systems have little interactive quality and have not been very successful commercially.

There is also a system, known from the international patent application WO-A-91/06160 (RHOADES), for the distribution of video games with one or more storage centers and subscribers at a distance connected by telephone and by a system of cable television. Each subscriber has a games console that displays a video image on a standard television receiver and is connected both by telephone to a storage center and by cable to a television program distribution station. The telephone line enables the subscriber to choose his game, the program of which is transmitted to him in encoded form by cable. The games console has means (keyboard and screen) to converse with the storage center by the telephone line and especially to receive an authorization code for the use of a game, means to decode a selected games program that is received by the cable and a non-volatile memory card to memorize a games program.

A games console such as this is not open-ended and is strictly specialized in the choice of a game at a distance according to an unchanging procedure.

There is also a known system of interactive television described in the European patent application EP-A-0 624 040 (AT&T). In this system, a subscriber can choose his program. This interactive television system uses a mode of two-way pack transmission, between an information retrieval center and remote subscribers, on a cable network. The intelligence of the transaction is located at the information retrieval center, and the subscriber has a specialized interface pack specially designed to meet the requirements of the information retrieval center within the framework of a fixed dialog procedure.

SUMMARY OF THE INVENTION

The present invention is aimed at providing a highly user-friendly, low-cost interactive system enabling a television viewer to participate in games, remote purchasing or other activities, that can easily be customized so as to be suited to various forms of transactional applications that are not necessarily planned at the outset.

An object of the invention is an interactive television receiver console comprising a television receiver connected by a televised program reception channel to a televised program distributor implementing transactional applications and an interface pack provided with data transmission means connected to the televised program distributor by a data transmission channel, data reception means connected to the televised program distributor by at least one data reception channel and image overlay means connected to the television receiver and working on the image presented on the screen of this receiver. This console furthermore comprises:

- a keyboard enabling action by an operator,
- a chip card reader, and
- a chip card that gets plugged into the chip card reader and is customized for at least one transactional application whose running it manages.

Through the general-purpose structure of the interface pack and the specialized character of the chip card, this console has a wide range of uses and, at the same time, is suited to a wide range of transactional applications as well as being selective.

Advantageously, the data reception channel is superimposed on the televised program reception channel and accessible from the television receiver. It can be a dual channel with one part superimposed on the televised program reception channel and one part using a telephone channel or a cable channel if the television receiver is connected to a cable network.

The data transmission channel uses a telephone channel or the cable channel if the television receiver is connected to a cable network.

The keyboard may form one unit with the interface pack or it may be separate from it and connected by a wire link or another type of link such as infrared, radio or other links in order to make it easier to handle. Should it be separated from the interface pack, the keyboard may be coupled to the chip card reader which then no longer forms one unit with the interface pack.

The interface pack has its own electrical supply or is powered by the electrical supply of the television receiver.

BRIEF DESCRIPTION OF THE DRAWINGS

Other features and advantages of the invention shall appear from the following description of several embodiments given by way of examples. This description shall be given hereinafter with reference to the drawing of which.

SUMMARY OF THE INVENTION

Figure 1:
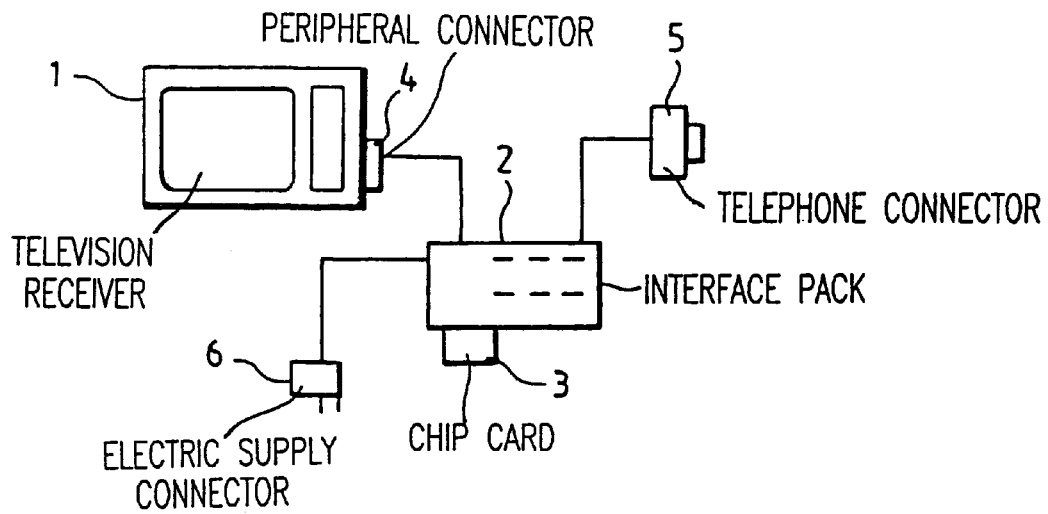
FIG. 1 gives a schematic view of an interactive television reception console according to the invention with a television receiver having a connector for TV peripheral units hereinafter called a TV peripheral connector.

FIG. 1 shows the main elements of an interactive television reception console, namely: a television receiver 1, an interface pack 2 and a chip card 3.

The television receiver 1 is of the standard type, with a TV peripheral connector enabling the rerouting of the image and sound signals after they are transposed into the video band. It receives television programs by RF channels or by means of a cable network.

The interface pack 2 is connected to the television receiver 1 by a TV peripheral connector 4, to a telephone line by means of a telephone connector 5 and to the mains by an electric supply connector 6. It is provided with a modem (modulator-demodulator) capable of managing via a two-way data transmission on a telephone line, to or from a computer information retrieval center, televised programs containing transactional applications, specially programmed by the distributor; a decoder circuit capable of the extracting, from the video signal received by the telephone receiver, data elements coming from the televised program distributor that are intended for the participants in transactional applications; an image overlay circuit working on the video image of the television receiver rerouted when it passes through the TV peripheral connector; a chip card reader; a keyboard; and a microcontroller managing these different elements under the control of the chip card 3.

The chip card 3 is a microcontroller card with an architecture based on a central processing unit (CPU) connected to RAM-type random-access memory elements or ROM and EEPROM read-only memory elements by means of an internal bus not accessible from the exterior and on a system of communications with the exterior ensuring imperviousness and security. The ROM contains an operating system enabling the management of the component and its security while the EEPROM contains an application-specific program in high-level language that is interpreted in machine language by a command interpreter contained in the operating system.

The chip card 3, using its application-specific program stored in an EEPROM, determines each step of a transactional application as a function of its own data elements stored in the memory and information elements that reach the interface pack 2 through the keyboard, the telephone line and the data channel superimposed on the televised programs received by the television receiver 1.

This chip card is very different from a prepayment card that has only a memory protected by a carrier code and that can be used only to count out points or tokens. It is also different from a non-volatile memory cartridge that is formed only by wired memory circuits on a support fitted with an electrical connector and that fulfils no special function of security of access.

The data reception channel superimposed on the televised programs received by the television receiver may contain information elements in textual form, in the form of drawings or in digital form pertaining to the different stages of a transactional application.

It may be added to the video signal received. This adding can be done either by videotex-type encoding in the frame flyback time and during the sweep starting and ending lines that are invisible on the screen or by a special encoding occupying a certain zone of the image which may be black on the screen by adjusting the chrominance. This zone is then preferably used by the overlay circuit to superimpose visual data elements intended for the television viewer on the running of the transactional application in progress.

It can also be added to the sound channel in DTMF type format (vocal frequency modulation) or any other type of format.

It is combined with a channel for the transmission and reception of data elements using the telephone channel which is better suited to the transmission by the distributor of targeted televised news programs more particularly intended for the possessor of the console.

A transaction may run as follows:

When the television viewer looks at a program implementing a transaction, he gets a clear message IS informing him that he must turn his interface pack on. As soon as this pack is powered, it runs a program to check the operation of its elements and then, in the event of positive test results, activates the chip card reader to come under the control of the chip card which must be in this reader. The chip card ascertains that the transaction envisaged is truly within its scope by comparing an internal code with a code emitted on the data channel superimposed on the video reception signal of the television receiver, calls the information retrieval center by telephone if necessary and runs the process of the transaction by informing the viewer through the overlay circuit, whenever necessary, either that the information retrieval center has to send him or her an information element that may or may not be personal or that he or she has to make a choice by means of the keyboard. Of course, the chip card may be one with a secret code if the transaction should require that the viewer be an entitled person.

The image and the sound of the television transmission may be encrypted. The chip card 3 then runs a process of decryption by intercepting or causing the reader to intercept the video signal received at the TV peripheral connector 4 and by sending or causing the reader to send the processed images to the television receiver, again through a TV peripheral connector 4 for display on the screen.

The additional information elements overlaid on the screen of the television receiver may be produced by the chip card 3 or sent by the information retrieval center by the data transmission channel superimposed on the televised program received or by the telephone link. In the latter case, they may come from a "Minitel" (or telephone terminal-based data bank system) emulation program that is carried out by the chip card 3. In any case, their display is done under the control of the chip card 3.

The chip card 3 may be exclusive and enable access to the data elements that is conditional upon the furnishing of an access code. The purchase of the chip card 3 then gives rights that may be managed in time by the card itself.

The chip card 3 may work with a system of security provided by code, authentication or signature.

The interface pack 2 is not specialized and has a standard electronic circuitry that enables the images to be received, processed and sent to the television receiver, further enables the function of a telephone link to be fulfilled, permits the receiving of a chip card and provides for the processing of the information elements transmitted by the keyboard. Therefore, it may be used for many types of televised transactions in which the participants are guided by information elements that are personal in varying degrees, displayed by overlay on the image of a television receiver, wherein a call made by each participant to a information retrieval center provides possibilities of dialog enabling an immediate choice or selection to be made by the participant as well as by the information retrieval center.

However, this does not mean that any possessor of the interface pack can make any transaction. For it is necessary, in order to make an interface pack operational, to have the chip card that manages the running of the desired transaction.

It is the chip card that enables a transactional application to be launched. During a transaction, it may collect a credit in the form of bonus points for which the unit of value is defined by the owner of the application. These bonus points acquired during an interactive sequence may be totaled and finally exchanged against the value given to them by the owner of the application, for example in a store. This circulation of bonus points may be the basis of motivation of an advertising game.

Several applications may, as the case may be, be managed by one and the same chip card and loaded into separate directories with a retailer. This acquisition may be temporary or permanent. The mode of acquisition may be varied. For example, it may entail loading into a terminal at the premises of an applications retailer or even at a sales point. It may also be loaded by connection to a "Minitel" information retrieval center and, in this case, the mode of payment is defined on the basis of the connection and the time taken or on any other basis by the supply of bank card information.

Figure 2:
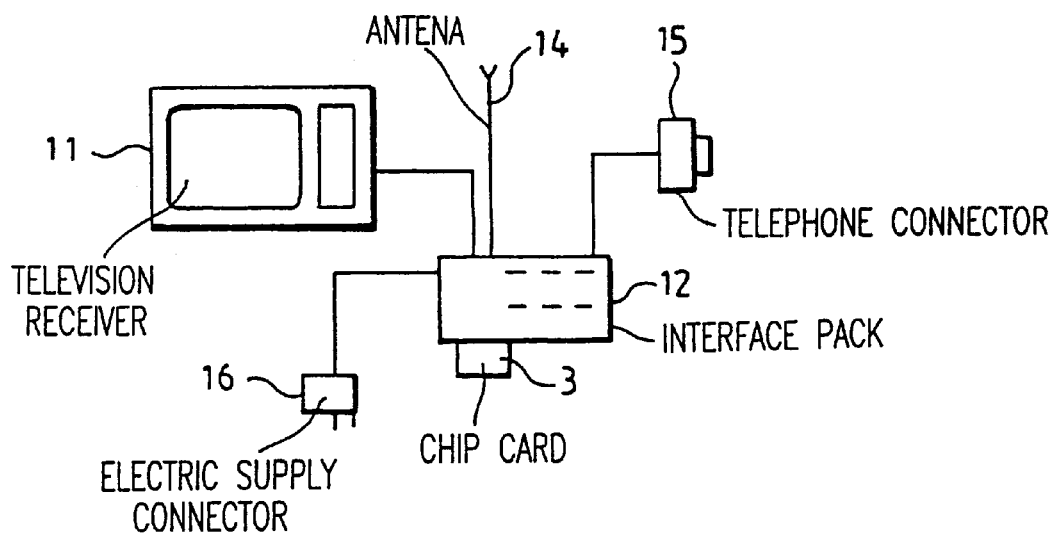
FIG. 2 gives a schematic view of an interactive television reception console according to the invention with a television receiver having no TV peripheral connector.

FIG. 2 illustrates a variant of an interactive television reception console of FIG. 1 wherein the television receiver 11 has no TV peripheral connector and the link with the interface pack 12 is done by means of an UHF or VHF antenna cable that is rerouted by the interface pack 12 before reaching the antenna 14 or the connection point of a cable network.

As above, the interface pack 12 is connected to a telephone line by a telephone connector 15 and to the mains by a supply connector 16. It is fitted out with a keyboard and a chip card reader designed to receive a chip card 3 that controls the running of a transaction.

Figure 3:
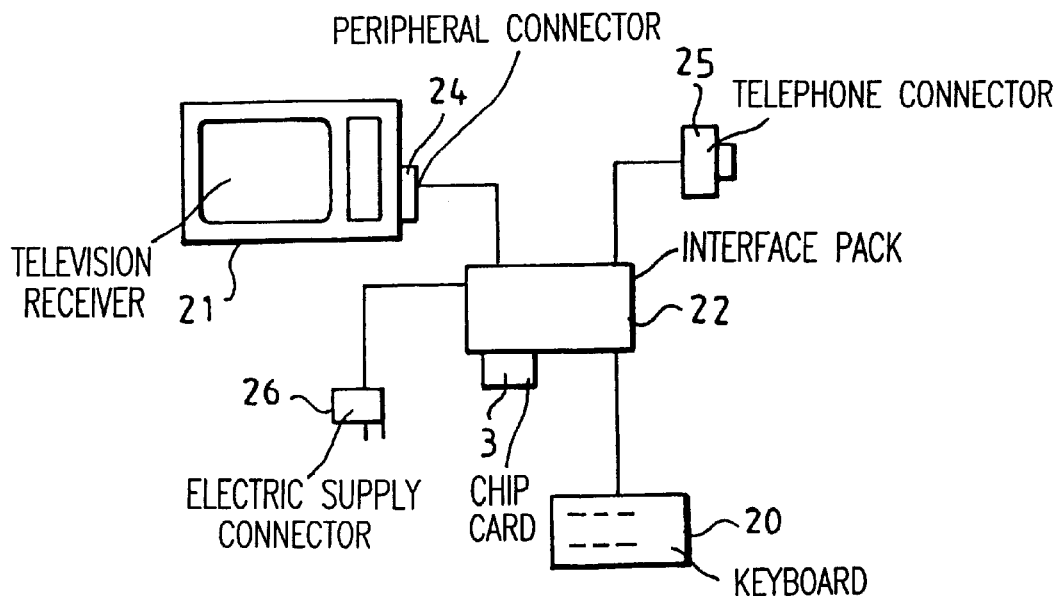
FIG. 3 gives a schematic view of an interactive television reception console according to the invention with a detached keyboard.

FIG. 3 illustrates another variant of the interactive television reception console of FIG. 1, wherein the keyboard 20 has been detached from the interface pack 22. As in the case of FIG. 1, the interface pack 22 is connected to the television receiver 21 by a TV peripheral connector 24, to a telephone line by a telephone connector 25 and to the mains by a supply connector 26.

The fact that the keyboard 20 is separate from the interface pack 22 and connected to it by a wire link or by an infrared link or by radio provides greater ease in the handling of the console.

Figure 4:
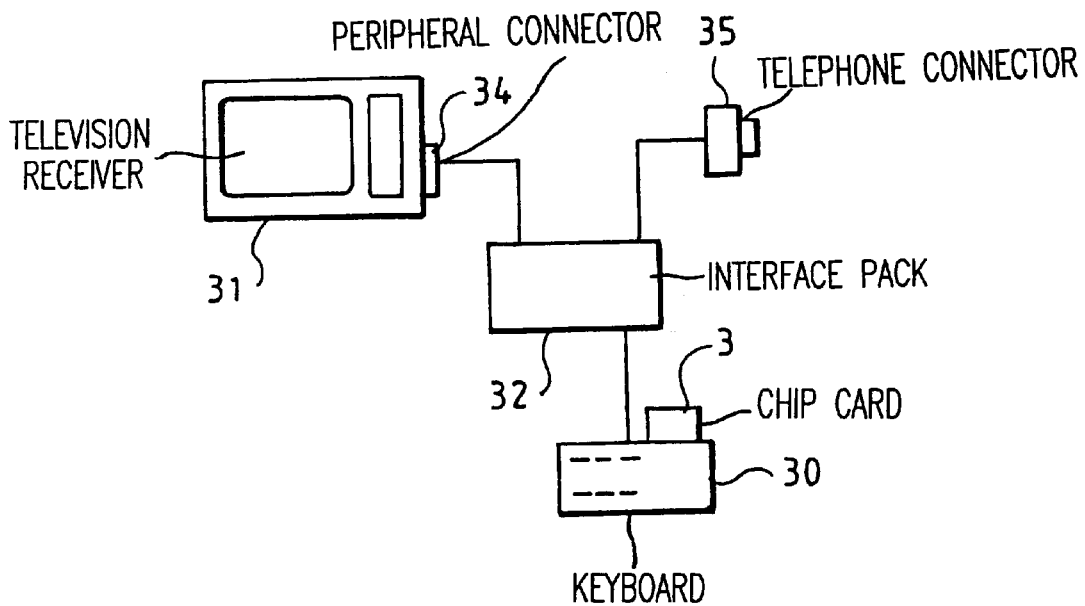
FIG. 4 gives a schematic view of an interactive television reception console according to the invention with a keyboard and a chip card reader constituting separate units and with an electrical supply taken from the supply of the television receiver.

FIG. 4 illustrates yet another variant of the interactive television reception console of FIG. 1 in which the keyboard 30 and the chip card reader have been separated from the interface pack 32 for greater ease of handling. As in the case of FIG. 1, the interface pack 32 is connected to the television receiver 31 by a TV peripheral connector 34 and to a telephone line by a telephone connector 35. However, it has no electrical supply of its own, this supply being common with that of the television receiver by means of a special connection of the TV peripheral connector 34. It could also be supplied by the supply of the television receiver 31 through a specific connector for this purpose.

Naturally, the present invention is not limited to the embodiments described and shown but could have numerous variants accessible to those skilled in the art without there being any departure from the spirit of the invention. The telephone line, especially in the case of a cable television network, may be replaced by a channel for the transmission of data by cable. The interface pack may be placed within the television receiver and its keyboard may be that of the remote control unit of the television receiver. This makes it possible to have a far more compact interactive console. There may also be, in the television receiver channel, an ancillary carrier assigned to the transmission of special information, in digital or other form, from the applications generator to the viewer without any effect on the reception of the image and the sound but being detectable by appropriate signal processing means with which the reader would be equipped.

What is claimed is:

1. An interactive television receiver console comprising:
   a television receiver;
   an interface pack linked to said television receiver, said interface pack including a data transmission means for transmitting transmitted data to a televised program distributor which implements transactional applications based on said transmitted data, a data reception means for receiving received data from said televised program distributor, and an image overlay means for overlaying an image corresponding to said received data on another image displayed on said television receiver;
   a keyboard linked to said interface pack configured to enter information elements to said interface pack;
   a chip card reader linked to said interface pack; and
   a chip card which is inserted into said chip card reader to enable reading of data from said chip card, said chip card comprising:
      a memory configured to hold said chip card data and
      a processor configured to determine steps in said transactional applications based on said chip card data.

2. A console according to claim 1, wherein said data reception means are connected to said televised program distributor by at least one data reception channel superimposed on a televised program reception channel.

3. A console according to claim 1, wherein said data transmission means are connected to said televised program distributor by a data transmission channel using a telephone line.

4. A console according to claim 1, wherein said television receiver is connected to said televised program distributor by a televised program reception channel using a cable network, wherein said data transmission means are connected to said televised program distributor by a data transmission channel using said cable network.

5. A console according to claim 1, wherein said interface pack is connected to said television receiver by means of a TV peripheral connector.

6. A console according to claim 1, wherein said interface pack is connected to said television receiver by means of a UHF-VHF antenna connector.

7. A console according to claim 1, wherein said interface pack has an electrical supply of its own.

8. A console according to claim 1, wherein said interface pack has an electrical supply common with that of said television receiver.

9. A console according to claim 1, wherein said keyboard is a separate unit from said interface pack.

10. A console according to claim 1, wherein said keyboard and said chip card reader that are separate units from said interface pack.

11. A console according to claims 9 or 10, wherein said keyboard forming a separate unit is connected to said interface pack by a wire link.

12. A console according to claims 9 or 10, wherein said keyboard forming a separate unit is connected to said interface pack by an infrared or radioelectrical link.

* * * * *

UNITED STATES PATENT AND TRADEMARK OFFICE
CERTIFICATE OF CORRECTION

PATENT NO. : 6,330,021 B1　　　　　　　　　　　　　　　　　　　　Page 1 of 1
DATED : December 11, 2001
INVENTOR(S) : Devaux It is certified that error appears in the above-identified patent and that said Letters Patent is hereby corrected as shown below:

Title page,
Item [73], the Assignee information is incorrect.
Item [73], should read:

-- [73] Assignee:　　Oberthur Card System SA, Paris (FR) --

Signed and Sealed this

Nineteenth Day of March, 2002

*Attest:*

*Attesting Officer*　　　　　　JAMES E. ROGAN
　　　　　　　　　　　　　*Director of the United States Patent and Trademark Office*